(No Model.)
J. O. HOLTZMAN.
HORSE DETACHER.
No. 433,344. Patented July 29, 1890.
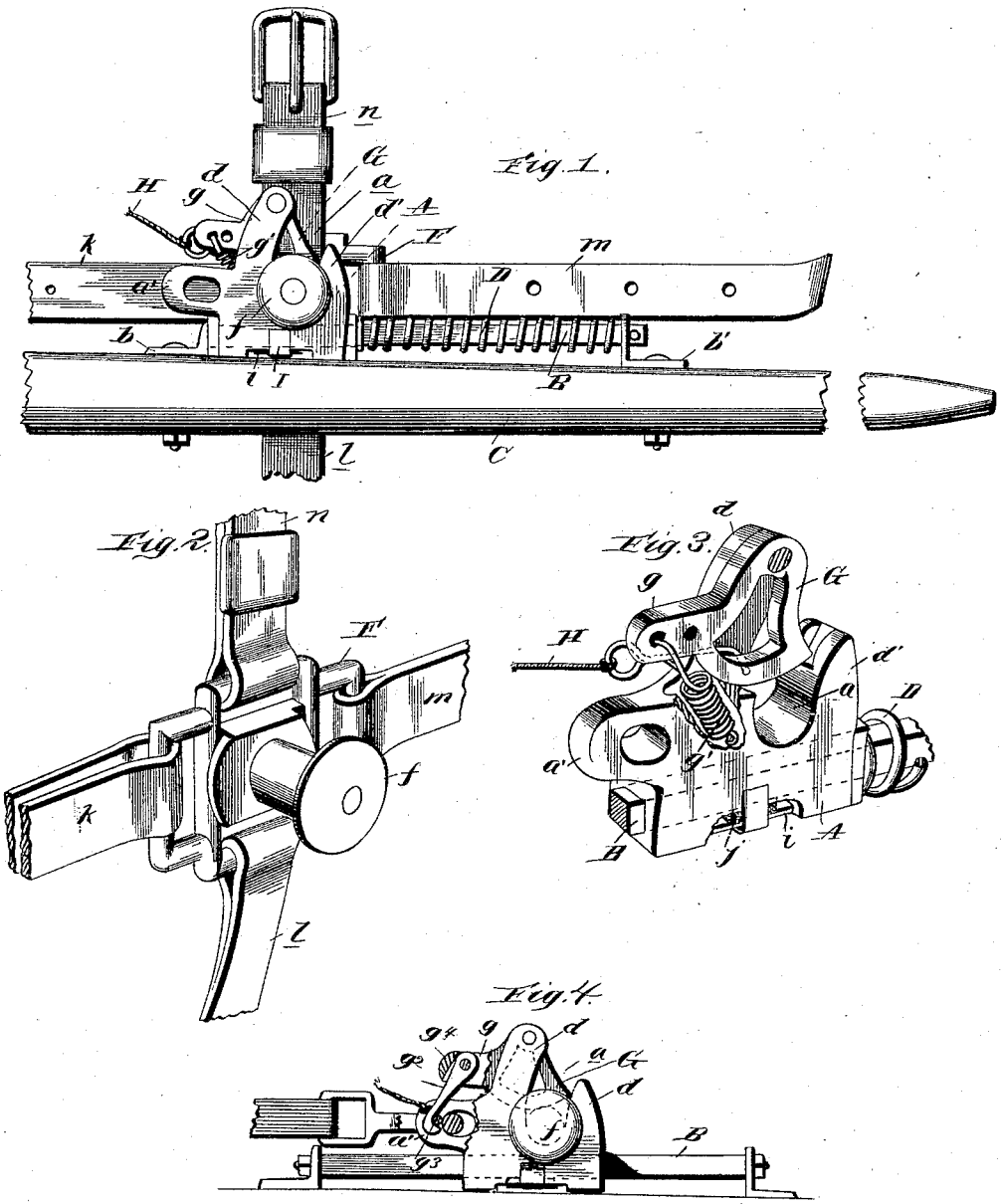
Witnesses:
Inventor.
James Oliver Holtzman
By R. S. & A. B. Lacey
his Attorney

UNITED STATES PATENT OFFICE.

JAMES OLIVER HOLTZMAN, OF HAGERSTOWN, MARYLAND.

HORSE-DETACHER.

SPECIFICATION forming part of Letters Patent No. 433,344, dated July 29, 1890.

Application filed November 1, 1889. Serial No. 328,894. (No model.)

*To all whom it may concern:*

Be it known that I, JAMES OLIVER HOLTZMAN, a citizen of the United States, residing at Hagerstown, in the county of Washington and State of Maryland, have invented certain new and useful Improvements in Detaching Horses; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to harness, and particularly to the means whereby the horse can be readily and quickly detached from the vehicle when required, and which will admit of the horse being hitched and unhitched without care on the part of the attendant to buckle or otherwise secure the backing-straps and the traces.

The improvement admits of the use of short traces, or the latter may be dispensed with. In either case a smart pull on a releasing-cord will liberate the animal.

The improvement consists of the novel features which will be hereinafter more fully described and claimed, and which are shown in the annexed drawings, in which—

Figure 1 is a side view of my invention. Fig. 2 is a perspective view of the harness-buckle to which the backing, tug, girth, and saddle straps are secured. Fig. 3 is a perspective view of the holdback. Fig. 4 is a side view, partly in section, showing a modified form of fastening for the gravity-catch on the holdback, and showing the trace fastened to the said holdback.

The holdback A is mounted on the bar B, which is secured to the thill C. The bar B is fastened at its ends in the brackets $b$ and $b'$, which are secured to the thill in any suitable manner. The holdback is adapted to slide on the bar B, but is held from turning thereon. The spring D on bar B, between the holdback and the bracket $b'$, receives the draft and permits the holdback to move in unison with the shoulder action of the animal. The vertical recess $a$ forms two arms $d$ and $d'$, between which the lateral projection $f$ on the harness-buckle F is inserted and held from vertical displacement by the gravity-catch G, which is pivoted at its upper end to the arm $d$, which is slotted to receive the said catch. This catch projects across the space between the two arms $d$ and $d'$, and is fastened in this position by suitable devices.

In Figs. 1 and 3 the fastening means is a spring $g'$, which is between the holdback and the rear arm $g$ of the catch. In Fig. 4 the fastening means are hook $g^2$ and stop $g^3$, the hook being pivoted to arm $g$ of catch G and the stop $g^3$ being on the rear arm $a'$ of the holdback. The releasing-cord H is attached to the catch G in Figs. 1 and 3, and to the hook $g^2$ in Fig. 4, the hook $g^2$ being limited in its backward movement by the stop $g^4$. The arms $g$ and $a'$ are slotted to receive the hook $g^2$, and the stops $g^4$ and $g^3$ are extended across these slots. The lower end of the holdback is recessed, and a keeper I is projected across said recess to support the spring-plate $i$, on which is placed packing $j$ to take up wear between the holdback and the bar B.

The harness-buckle F, having the lateral projection $f$, has the backing-strap $k$, the girth-strap $l$, the tug-strap $m$, and the saddle-strap $n$ secured thereto.

In practice the horse being harnessed is hitched to the vehicle by inserting the lateral projection of buckle F in the recess $a$ of holdback A, and fastening it therein by the gravity-catch G. To unhitch the horse the catch is drawn back sufficiently far, when the thill will drop by its own weight.

Figs. 1 and 3 show the holdback adjusted so that the draft will be applied directly to the thills.

Fig. 4 shows a trace M, fastened to the holdback, the spring D being removed from the bar B and the holdback moved nearer the bracket $b'$, whereby the holdback will have ample play on the bars to adapt it to the shoulder motion of the animal.

Having fully described my invention, what I claim, and desire to secure by Letters Patent, is—

1. The combination, with the thill and the holdback having vertical recess $a$, of the pivoted catch adapted to be projected across the said recess, and the releasing-cord applied to the said catch, substantially as described.

2. The combination, with the thill and the holdback having vertical recess $a$, of the pivoted catch adapted to be projected across the said recess, and means for positively holding it in a projected position, substantially as described.

3. The combination, with the thill and the holdback mounted on the thill and adapted to move thereon, of the spring-plate and the packing, substantially as and for the purpose described.

4. The combination, with the thill and the holdback having a vertical recess, of the pivoted gravity-catch, the fastening-hook, and the releasing-cord attached to the said hook, substantially as described.

In testimony whereof I affix my signature in presence of two witnesses.

JAMES OLIVER HOLTZMAN.

Witnesses:
M. L. MIDDLEKAUFF,
JAMES ALOM ALBERT.